United States Patent
Schwartz

[15] 3,654,847
[45] Apr. 11, 1972

[54] ELECTRICALLY OPERATED SHUTTER MECHANISM FOR CAMERA

[72] Inventor: Joseph E. Schwartz, Irondequoit, N.Y.
[73] Assignee: Victronic, Inc., Victor, N.Y.
[22] Filed: Apr. 21, 1970
[21] Appl. No.: 30,493

[52] U.S. Cl. ...................................................95/63
[51] Int. Cl. ...................................................G03b 9/24
[58] Field of Search..........................................95/63

[56] References Cited

UNITED STATES PATENTS

| | | | |
|---|---|---|---|
| 2,035,684 | 3/1936 | Barenyi | 95/63 |
| 3,187,654 | 6/1965 | Starp | 95/63 |
| 3,283,686 | 11/1966 | Singer et al. | 95/63 |
| 3,468,237 | 9/1969 | Cotta et al. | 95/63 |
| 3,526,181 | 9/1970 | Fahlenberg et al. | 95/63 |

Primary Examiner—Samuel S. Matthews
Assistant Examiner—Michael L. Gellner
Attorney—Shlesinger, Fitzsimmons & Shlesinger

[57] ABSTRACT

This mechanism comprises a housing containing overlapping shutter blades, which are pivoted between open and closed positions by an oscillatable ring that is spring-loaded to a blade-closing position. The ring is connected by a flexible arm to the armature of a solenoid, which is mounted in the housing to be pulse energized momentarily to advance its armature in a direction to cause the flexible arm to rotate the ring to open the shutter blades. An adjustable aperture stop is engagable with a pin on the ring to limit the extent of its rotation and therefore the size of the shutter opening. Each time the solenoid is energized its armature advances far enough to close a switch for controlling a flash attachment. The blades can be held open for focusing by a cam latch which can be released manually or by operation of the solenoid.

14 Claims, 5 Drawing Figures

INVENTOR.
JOSEPH E. SCHWARTZ

ELECTRICALLY OPERATED SHUTTER MECHANISM FOR CAMERA

This invention relates to shutter mechanisms for cameras, and more particularly to an electrically operated shutter mechanism of the between-the-lens variety.

Most conventional cameras employ manually-operable trigger devices for momentarily opening or actuating their shutter mechanisms. One disadvantage of a camera of this type is that its accuracy, particularly with respect to the photographing of high-speed action events, is limited by the ability of the operator to trigger the shutter mechanism at the exact moment necessary to photograph a desired scene or occurrence. Moreover, since it is often necessary to supplement ambient light with a camera flash attachment, such a camera usually includes a device for synchronizing the operation of its shutter mechanism with that of the flash attachment. Often these synchronizing devices are complex and unreliable.

For a camera which employs a between-the-lens shutter mechanism, it often has been customary to provide a manually operable latch for holding the shutter open, so that rather than relying upon a range finder or view finder, the operator can peer through the open shutter and lenses to focus directly on the object that is to be photographed. Then, before taking a picture, the operator must release the latch manually to return the control of the shutter to the normal shutter actuating mechanism. A still further disadvantage of such prior camera is that its pivotal iris members or shutter blades have not proved to be perfectly satisfactory.

An object of this invention is to provide a novel camera shutter mechanism which can be actuated electrically by a remote control system.

A further object of this invention is to provide an improved, electrically operable shutter mechanism having pivotal shutter blades, and means for adjustably limiting the movement of these blades to vary the size of the aperture formed thereby.

A still further object of this invention is to provide for a shutter mechanism of the type described a synchronization device for automatically actuating an associated photo flash attachment, when the shutter mechanism reaches its fully open position.

Another object of this invention is to provide a novel between-the-lens shutter mechanism having a releasable latch for securing the shutter in its open position, and means for automatically releasing the latch from a position remote from the associated camera.

A still further object of this invention is to provide a between-the-lens shutter mechanism, which is substantially more compact and reliable than prior such mechanisms. To this end it is an object also to provide for such a mechanism an improved shutter blade, which will permit the mechanism to operate more rapidly and accurately than prior such mechanisms.

Other objects of the invention will be apparent hereinafter from the specification and from the recital of the appended claims, particularly when read in conjunction with the accompanying drawings.

Figure 2:
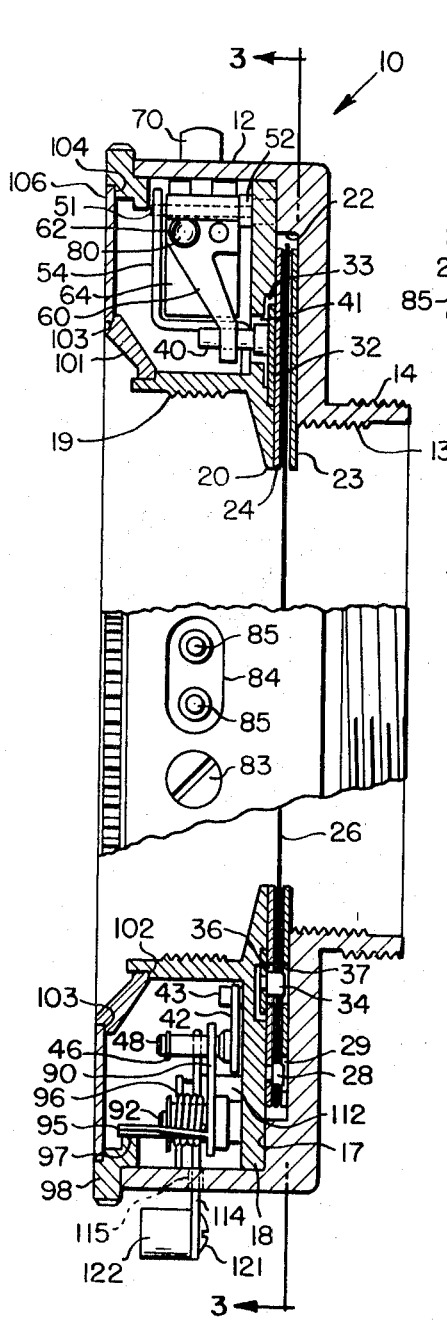
FIG. 2 is a side elevational view of this shutter mechanism with parts thereof being broken away and shown in section.

Referring now to the drawings by numerals of reference, 10 denotes generally a between-the-lens shutter mechanism comprising a generally cup-shaped housing or casing 12 having in its rear or closed end an internally threaded bore 13 (FIG. 2) for removably accommodating the rear lens element of a camera (not illustrated). An externally threaded annular flange or boss 14, which projects from the rear of casing 12 coaxially of bore 13, is threadable into the lens board of a camera removably to secure the shutter mechanism 10 to the camera.

Secured by screws 16 (FIG. 1) against an internal annular shoulder 17 (FIG. 2) which is formed in the casing 12 adjacent its closed end, is a circumferential plate or forward lens mount 18. An annular flange 19 on the forward or left hand face (FIG. 2) of plate 18 registers coaxially with a reduced-diameter bore 20, which is formed in the plate coaxially of the casing bore 13. Flange 19 is threaded internally for removably supporting the front lens element (not illustrated) of a camera in registry with the bore 20 and the rear lens element in the usual manner.

Figure 3:
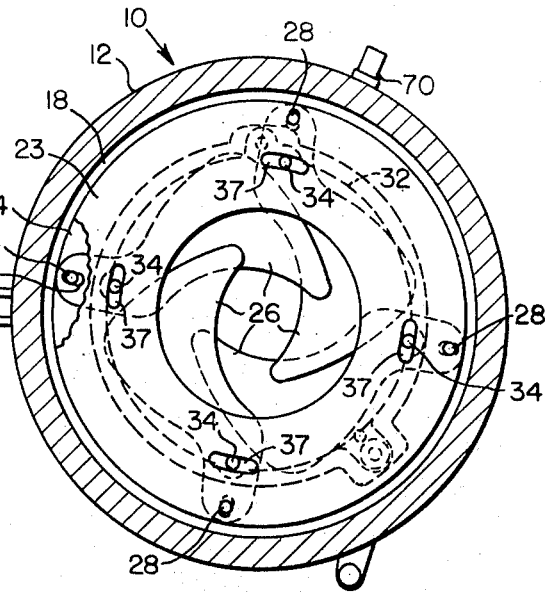
FIG. 3 is a sectional view of this mechanism on a reduced scale, taken along the line 3—3 in FIG. 2 looking in the direction of the arrows, and illustrating the shutter blades in one of their open positions.

Secured coaxially in a counterbore 22 (FIG. 2) in casing 12 between plate 18 and the closed end of the casing are two, axially spaced rings 23 and 24. These rings, which have axial bores that are equal in diameter to, and which register with the bore 20 in the plate 18, are fastened by conventional screws (not illustrated) to the confronting surfaces of plate 18 and casing 12, respectively. Mounted between these rings for pivotal movement between open and closed positions with respect to bores 20 and 13 are four, identical, generally sickle-shaped shutter blades 26 (FIGS. 1, 3 and 5) having generally straight outer ends, and curved inner ends. These blades, which overlap one another at their inner ends in the usual manner (FIGS. 1 to 4), are mounted adjacent their outer ends to pivot about the heads of four stationary pins 28, which are secured to ring 24 at 90° intervals thereabout, and which project through slots 29 (FIGS. 1, 3 and 5) in the outer ends of blades 26, and into registering openings in ring 23.

The shutter blades 26 are controlled by an operating ring 32 (FIGS. 1 and 2) which is mounted in an annular recess 33 (FIG. 2) in the rear face of plate 18 to oscillate coaxially of casing 12. At 90° intervals thereabout ring 32 carries four drive pins 34 (FIGS. 1 to 3), which project through registering openings 35 (FIG. 5) in the four shutter blades 26 and arcuate clearance slots 36 and 37 in the rings 24 and 23, respectively. The slots 36 and 37 are disposed coaxially of casing 12, and radially inwardly of the stationary pins 28, so that upon oscillation of the ring 32 the drive pins 34 function as oscillating fulcrums for the blades 26, thereby imparting both translational and pivotal movement to the blades 26 relative to their stationary pivot pins 28.

The oscillatory movements of the actuating ring 32 are controlled by an operating pin 40 (FIGS. 1 and 2), which projects from ring 32 through a first arcuate slot 41 formed in the plate 18, and by a two-armed lever 42, which pivots intermediate its ends on a further pin 43, which projects from ring 32 through a second slot 44 (FIG. 1) that is formed in plate 18 at a point angularly spaced from slot 41. Normally the operating pin 40 is held in a shutter-closing position against the right end of slot 41 (FIG. 1) by a tension spring 46, which is fastened at one end to a stationary pin 47 that projects from the face of plate 18, and at its opposite end to a pin 48, which is carried on one end of the lever 42. Spring 46 is radially offset from the center of pin 43 so that it urges lever 42 in a clockwise direction (FIG. 1) about pin 43, whereby the opposite end of the lever is normally held resiliently against a stop pin 49, which projects from ring 32 parallel to, but radially inwardly of, the pin 43. The tension in spring 46 is thus transmitted through lever 42 and the pin 43 to the operating ring 32, which thereby is subjected to a clockwise (FIG. 1) torque that holds the ring resiliently in its extreme clockwise position (FIG. 1), thereby holding the shutter blades 26 in their closed positions.

A rotatable pin 51, which extends parallel to pin 40, is journaled at one end in a bearing 52 (FIG. 2), which is fixed in plate 18 outwardly of its slot 41, and at its opposite end in a registering opening in the overlying end of a right angular bracket 54 which is fastened by screws 55 (FIG. 1) to plate 18 adjacent its slot 41. Mounted at its outer end on the pin 51 for rotational movement therewith is a flexible operating lever or arm 60, the inner end of which extends radially inwardly of the casing, and behind the primary operating pin 40. Staked by a headed pin 62 (FIGS. 1 and 2) to the flexible lever 60 adjacent the outer end thereof, and pivotal with this lever about the axis of pin 51, is a rigid, dielectric switch-actuating arm or member 64.

Each time the shutter mechanism is tripped to take a picture, as described in more detail hereinafter, the member 64 is swung clockwise (FIG. 1) beneath the overhanging portion of bracket 54, and into contact with the free end of a flexible switch arm 66 (FIG. 1), which is adapted to form part of the control circuit of a flash attachment (not illustrated) that may be employed with the associated camera. At its opposite end arm 66 is fastened beneath a metal plate 67, which is secured by screws 68 to the inner peripheral surface of the casing 12 outwardly of bracket 56. Secured in the bore of a plastic insulating sleeve 69, which is mounted in a metal housing 70 that is secured in registering openings in the plate 67 and casing 12, is a conventional, metal jack receptacle 72. Receptacle 72 has a headed inner end 73 positioned in casing 12 for engagement by the switch arm 66, and an axial bore in its outer end at the exterior of the casing for accommodating the male jack of a conventional flash attachment (not illustrated).

Figure 1:
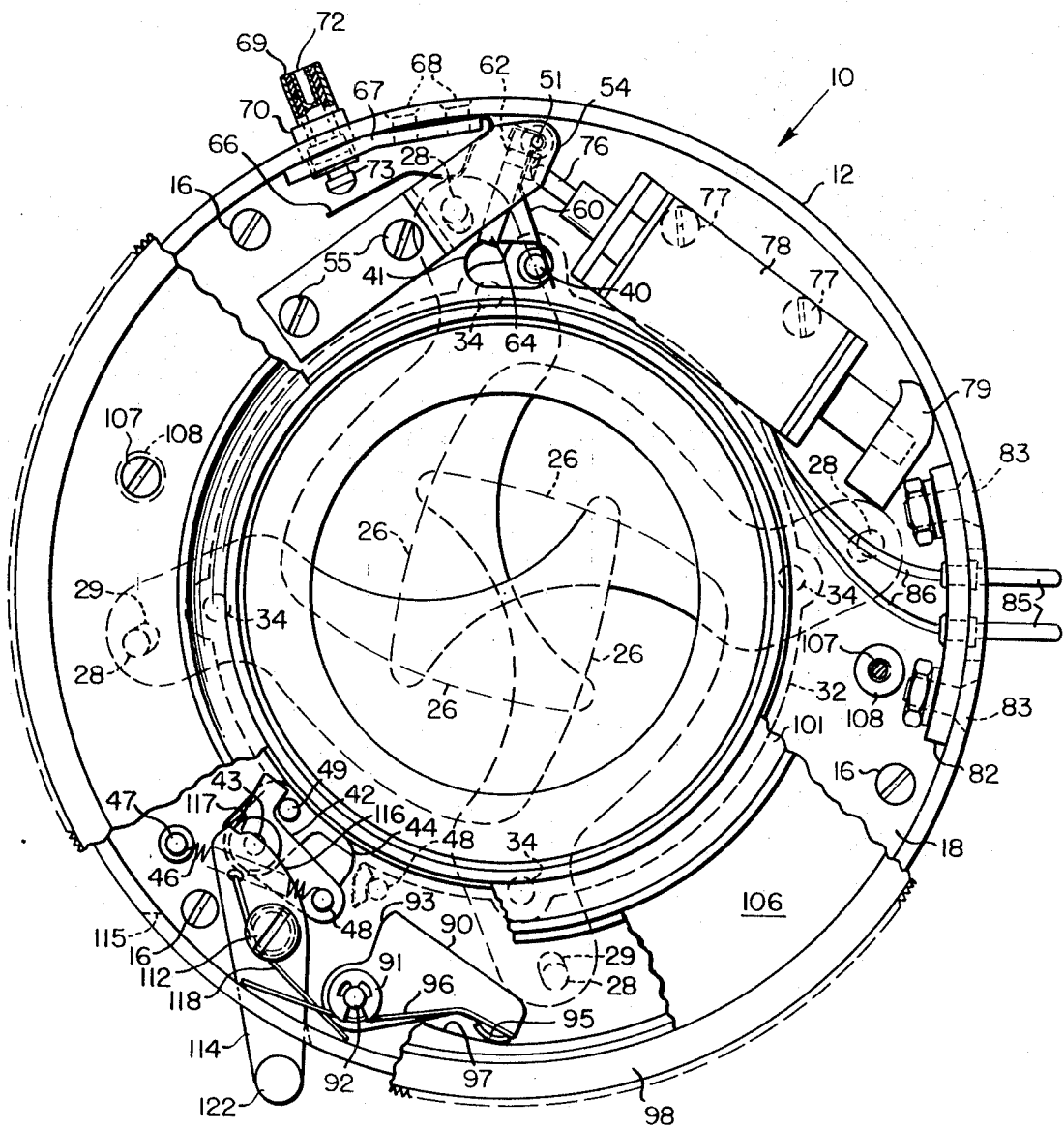
FIG. 1 is a front elevational view of a between-the-lens shutter mechanism made in accordance with one embodiment of this invention, the shutter being illustrated in its closed position and with portions thereof broken away for purposes of illustration.

The arms 60 and 64, which normally are disposed in the positions illustrated in FIG. 1, are adapted to be actuated by the armature 76 (FIG. 1) of a solenoid 78, which is secured by screws 77 to the face of plate 18 adjacent slot 41 so that the armature 76 will reciprocate at right angles to the axis of pin 40, and substantially parallel to a tangent to casing 12. When the solenoid 78 is deenergized, a piece of resilient sponge rubber 79, which is interposed between the casing 12 and the inoperative end of the armature 76 ( the right end in FIG. 1), holds the armature resiliently in a fully seated position in which its opposite or operating end (the left end in FIG. 1) is seated resiliently in a registering dimple or recess 80 (FIG. 2) formed in the head of the screw 62.

Fastened at their inner ends to an arcuate plate 82 (FIG. 1), which is secured by a pair of screws 83 to the inside of casing 12 adjacent the solenoid 78, and projecting through a registering opening 84 (FIG. 2) in the casing, are two, spaced, parallel male connectors 85, the inner ends of which are connected in a conventional manner by insulated wires 86 to opposite ends of the operating coil (not illustrated) of the solenoid 78. The jacks 85 are adapted to connect the solenoid 78 to a control circuit (not illustrated), which can be triggered momentarily to supply an operating voltage or pulse to the winding of the solenoid 78. This voltage pulse causes the armature 76 to be shifted momentarily outwardly, or advanced toward the left in FIG. 1 against the screw 62, thereby pivoting the arms 60 and 64 clockwise about the axis of shaft 59, and momentarily causing the shutter operating pin 40 and ring 32 to be urged in counterclockwise directions (FIG. 1) about the axis of the casing 12.

In order to control the size of the aperture formed by the shutter blades 26, when opened, a stop lever 90 (FIGS. 1, 2 and 4) is held by a lock washer 91 (FIG. 1) to pivot at one end about a stationary pin 92, which projects from the face of plate 18 adjacent the lever 42. Adjacent its pivotal end lever 90 has a curved edge or camming surface 93 (FIGS. 1 and 4), which normally is positioned in the path of pin 48 on lever 42 for engagement thereby when the shutter ring 32 is actuated, thus to limit the rotational movement of the ring 32 in a counterclockwise (FIG. 1) or shutter-actuating direction. At its opposite end lever 90 has an upwardly or laterally bent tang or cam follower 95, which projects toward the open end of casing 12. A torsion spring 96, which surrounds the hub of lever 90, is seated at one end against the inner peripheral surface of the casing 12, and at its opposite end against the cam follower 95.

This spring urges lever 90 clockwise (FIG. 1) about pin 92 to maintain the follower 95 in sliding contact with an arcuate camming surface 97 (FIGS. 1, 2 and 4) formed on the inner peripheral surface of an aperture adjusting ring 98, which is rotatably mounted in the open end of casing 12 coaxially thereof. Ring 98 projects radially beyond the outer periphery of casing 12 and is knurled to ease its adjustment angularly relative to the casing.

Mounted snugly and coaxially on the outer or left end (FIG. 1) of the flange 19 is an annular collar 101, which has an outside diameter substantially smaller than the inside diameter of the ring 98. The inner end of collar 101 is seated against an external shoulder 102 (FIG. 2) formed on the flange 19 adjacent its outer end; and the opposite end of the collar is coplanar with the outer end of ring 98. The annular space between the casing 12 and the forward lens mount 19 is sealed by an annular face plate 106, the peripheral edges of which are seated in registering annular recesses 103 and 104 (FIG. 2) formed in the outer ends of collar 101 and ring 98, respectively. Plate 106 is secured by screws 107 (FIGS. 1 and 4) to a pair of stationary posts 108, which project from the face of mounting plate 18 at diametrically opposite sides thereof. Plate 106 thus serves also to secure the rotatable ring 98 against axial movement relative to the casing 12.

Figure 4:
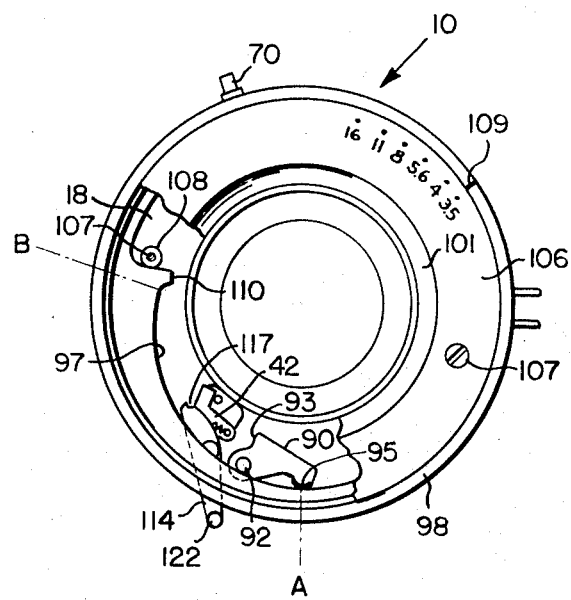
FIG. 4 is a further, front elevational view of this shutter mechanism, but on a smaller scale than FIG. 1, and broken away in part to illustrate more clearly the cam mechanism for controlling the shutter aperture.

In FIGS. 1 and 4, the cam follower 95 is shown to be in contact with the beginning of the camming surface 97, or with the point A thereon where the surface merges with the normal or circular portion of the inner peripheral surface of the ring 98. Between this point and the point B, which defines approximately the opposite end of the camming surface 97, the inner radius of the ring 98 decreases gradually until it reaches an abrupt radial projection or stop lug 110 (FIG. 4), which is formed on the ring 98 at a point angularly spaced slightly greater than 90° from point A. When the ring 98 is disposed in the position illustrated in FIGS. 1 and 4, the stop lug 110 engages one of the stationary posts 108 (FIG. 4) to prevent further rotation of the ring in a clockwise direction relative to casing 12. At this time the stop lever 90 is thus held by spring 96 in its extreme clockwise (FIG. 1) position, so that the space between its cam surface 93 and the pin 48 on lever 42 will be at a maximum prior to the operation of the shutter. Also at this time an index line 109, (FIG. 4), which is inscribed on the face of the ring 98 for registry with conventional indicia that is inscribed on the face of plate 106 to indicate various shutter settings, will be aligned with the indicium denoting the largest possible aperture opening (for example, 3.5).

The ring 98 can be adjusted counterclockwise on the casing 12 from its illustrated position to cause a different portion of the camming surface 97 to be shifted behind the follower 95, and thereby to effect pivotal movement of the stop lever 90 in a counterclockwise direction (FIG. 1) about pin 92. This movement swings the camming surface 93 closer to the pin 48 on lever 42, thereby reducing the maximum opening that will be formed by the shutter blades 26 when they are actuated. For example, if the ring 98 is rotated counterclockwise until the follower 95 engages the stop lug 110, lever 90 will be in its extreme counterclockwise position about the pin 92, and the index line 109 on ring 98 will register with the indicium on the ring 106 corresponding to the smallest lens opening, or aperture, for which the associated camera may be set.

Pivotally mounted intermediate its ends on a stationary post 112 (FIGS. 1 and 2), which projects from the face of plate 18 adjacent its opening 44, and parallel to the pin 92, is a manually operable lever 114, which can be employed to latch the shutter blades 26 in their open positions for purposes of focusing or the like. Lever 114 has an outer end, which projects radially through a slot 115 in the annular wall of casing 12 to the exterior thereof. Intermediate its ends lever 114 has on the edge thereof which faces the pin 48, a curved camming surface 116 (FIG. 1), which terminates at a notch 117 (FIGS. 1 and 4) that is formed in the inner end of the lever. A coiled torsion spring 118 (FIG. 1), which surrounds post 112, is fastened at one end in an opening in lever 114, and at its opposite end is engaged with the inner surface of the casing 12 normally to urge the lever 114 into its extreme counterclockwise position about post 112, wherein adjacent its outer end the lever is seated against one end of the slot 115 in casing 12 as shown in FIG. 1.

Secured to the outer end of lever 114 by a screw 121 (FIG. 2) is a conventional cylindrical block 122, by means of which lever 114 is adapted to be pivoted manually about post 112 to an operative position in which the outer end of the lever is seated against the opposite end of slot 115. During this clockwise movement of lever 114 its camming surface 116 engages and urges the pin 48 simultaneously radially inwardly, and angularly clockwise about the axis of the shutter mechanism, to a shutter-opening position in which the pin 48 is seated releasably in the notch 117 as illustrated fragmentarily and by broken lines in FIG. 1. During this movement of the pin 48 to its broken line position, the camming surface 116 causes the lever 42 to be pivoted slightly counterclockwise about pin 43 (FIG. 1), thereby to swing pin 48 radially inwardly to avoid engagement thereof with the camming surface 93 on the stop lever 90, regardless of the position of the latter, and at the same time it imparts translational movement to the lever 42 in a counterclockwise direction (FIG. 1) about the axis of the shutter, thereby imparting similar movement to the shutter actuating ring 32. Consequently, when the pin 48 has become seated in the notch 117, the shutter ring 32 will have been rotated counterclockwise a distance far enough to open the shutter blades 26 approximately to their fully open positions (corresponding approximately to maximum aperture opening), and the spring 46, which is now under tension, will tend to maintain the lever 114 in its aperture or shutter-opening position. To thereafter release the shutter blades, the lever 114 can be pivoted manually back to its full line or inoperative position as illustrated in FIG. 1, thereby releasing the pin 48 and lever 42 so that the spring 46 can return the shutter ring 32 to its normally-closed position; or, alternatively, the solenoid 78 can be energized momentarily to effect the release of the lever 114 as described more fully hereinafter.

In use the shutter mechanism 10 is mounted in a camera in a known manner, with a flash attachment connected to the receptacle 72, if desired, and with the male jacks 85 connected to any conventional one-shot pulsing circuit, which can be triggered to supply a predetermined voltage pulse to the solenoid leads 86. Before the shutter device is triggered the ring 98 is adjusted to set its index line 109 in registry with the desired lens or aperture opening as indicated by the indicia on plate 106.

Whenever an electrical pulse is applied to the solenoid 78, its armature 76 is momentarily advanced axially (or toward the left in FIG. 1) the same predetermined distance in the direction of the screw 62, thereby swinging the flexible arm 60 and the dielectric arm 64 clockwise about the axis of the shaft 59. The movement of the flexible arm 60 is transmitted to the operating pin 40, so that the shutter actuating ring 32 is rotated counterclockwise about the shutter axis a distance determined by the space that separates the pin 48 from the cam surface 93 on the stop lever 90 at the time solenoid 78 is energized. For example, assuming that the follower 95 is in the position illustrated in FIGS. 1 and 4, the shutter mechanism 10 will be set for maximum travel of the pin 48 and ring 32 about the axis of the shutter, so that pin 48 will not strike surface 93 until the shutter blades 26 have reached their fully open positions. At this time the shutter actuating pin 40 will have reached approximately the left end of the slot 41, and the arm 64 will have been swung far enough to close switch arm 66 against the stationary flash attachment terminal 73 thereby operating the associated flash at the moment that the shutter blades 26 are in their fully open positions.

Thereafter as the voltage pulse to solenoid 78 expires, the spring (not illustrated) in the solenoid retracts its armature 76 backwardly into the solenoid; and the spring 46 draws the pin 48, and hence the arm 42 in a clockwise direction about the axis of the shutter, thereby shifting the ring 32 clockwise back to its starting or shutter-closing position. During this movement the shank of pin 40 swings the flexible arm 60 counterclockwise about the axis of the shaft 59 to maintain the head of screw 62 in engagement with the armature 76.

If instead of being set for maximum shutter opening the ring 98 were to be adjusted, for example, for the smallest shutter opening, or the position in which the cam follower 95 is engaged with the stop 110 (FIG. 4), the cam surface 93 would be disposed as close as possible to the pin 48 at the commencement of the shutter actuating operation. Under these circumstances, when the shutter control device is triggered to supply the operating pulse for the solenoid 78, the armature 76 will again be advanced momentarily toward the screw 62, and for the same axial distance as before. This time, however, shortly after the flexible arm 60 commences to rotate the shutter ring 32, and before the pin 40 reaches the opposite end of slot 41, the pin 48 will engage the surface 93 on the stop lever 90 to limit further rotation of ring 32. When the lever 90 stops ring 32, and hence pin 40, the screw 62 and the dielectric switch actuating arm 64 nevertheless continue to be swung by the advancing armature 76 clockwise about the axis of shaft 59 until the arm 64 strikes and closes the flexible switch arm 66 thereby to actuate the associated flash attachment at the time that the blades 26 are open as far as permitted by lever 90. During this additional clockwise rotation of the screw 62 and the arm 64, the arm 60 is flexed or bent about its fixed end by the pin 40, which is now fixed against further angular movement because of the engagement of pin 48 with the stop lever 90. Thereafter as the solenoid 78 becomes deenergized, its armature 76 retracts, and spring 46 returns the shutter blades 26 to their closed positions as previously described.

From the foregoing it will be apparent that applicant has developed an electrically actuated, remotely operable shutter mechanism which is extremely compact and simple to operate as compared to prior such mechanisms. By employing the flexible arm 60 it has been possible to eliminate the need for adjusting the stroke of armature 76 for different aperture settings. Instead armature 76 always advances the same amount upon the energization of its associated solenoid coil; and consequently the screw 62 and the switch-actuating arm 64 are always rotated clockwise the same angular distance each time solenoid 78 is energized, and far enough to cause the arm 64 momentarily to engage and close the switch 66 at the instant that the plunger 76 has reached its fully advanced position. On the other hand, the angular movement of the flexible shutter-actuating arm 60 will depend upon the position of the cam follower 95 relative to the camming surface 97 on the adjustable ring 98. Thus the synchronization of the shutters and the flash attachment is fixed, and will not have to be adjusted for different aperture settings. Moreover, the aperture size or setting may be readily adjusted merely by rotating ring 98.

Another advantage of the herein disclosed mechanism is that if the operator of the associated camera wishes to open the shutter blades 26 for focusing pusposes, the lever 114 can be swung to its shutter opening position as previously described. In this position the pin 48 (broken lines in FIG. 1) seats in the notch 117 in the lever; and the tension of the spring 46 counteracts the tension in the spring 118, which tends to urge the lever 114 back to its inoperative or shutter-released position. Instead of manually pivoting the lever 114 back to its shutter-releasing position this lever can be released merely by pulsing or momentarily energizing the solenoid 78. Then, since the pin 48, (as illustrated by broken lines in FIG. 1), is spaced from the stop lever 90, it is free to be advanced by the solenoid plunger 76 and the flexible operating arm 60 slightly further in a counterclockwise direction about the axis of the shutter from its broken line position, or to a position in which the shutter blades 26 are swung to their fully open positions. This slight movement of the pin 48 out of the notch 117 permits the spring 118 to swing the lever 114 back to its inoperative position, thereby releasing the lever 42 and permitting the spring 46 to return this lever and the shutter actuating ring 32 to their inactive or shutter-closing positions.

Figure 5:
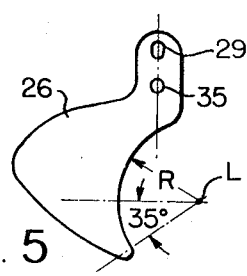
FIG. 5 is a detail view of a novel shutter blade employed with this mechanism.

A still further advantage of applicant's novel shutter mechanism lies in the use of the sickle-shaped shutter blades 26, which have longer curved ends than prior such blades. As shown in FIG. 5, the curved end of each blade 26 has an inner, arcuate, concave edge radially spaced a distance R from the locus L of the edge, and extending at least 35° beyond a line extending through the locus L, and at right angles to a line through the centers of the slot 29 and opening 35 in the blade. When the blades 26 are fully opened they define a perfectly circular aperture in the mechanism 10, but when lever 90 limits their movement to less than the maximum possible aperture, as shown for example in FIG. 4, the aperture begins to approach a rectangular configuration. However, by keeping the radius R reasonably small (e.g. .571 inches), and by using a curved end which is longer than that of conventional shutters, it is possible, for example, to have greater portions of adjacent shutters disposed in overlapping relation, thereby permitting the thickness of the blades to be reduced, and consequently increasing their speed of operation.

Having thus described my invention, what I claim is:

1. A camera shutter mechanism, comprising
    a casing having a central bore,
    a plurality of shutter blades mounted in said casing to pivot transversely of said bore between open and closed positions, respectively,
    an operating member mounted in said casing to move between active and inactive positions, respectively,
    means connecting said operating member to said blades to move said blades from their closed to their open positions upon movement of said operating member from its inactive to its active position, and vice versa,
    resilient means operative normally to maintain said operating member in its inactive position,
    shutter actuating means operable momentarily to drive said operating member from its inactive to its active position,
    aperture adjusting means mounted on said casing and adjustable from the exterior thereof adjustably to limit the travel of said operating member during movement thereof to its active position, thereby to limit the size of the aperture formed in said bore by said blades, when the latter are in their open positions,
    said actuating means including an actuating member mounted in said casing to advance a predetermined distance each time said actuating means is operated, and
    second resilient means interposed between said actuating member and said operating member and operative, each time said actuating means is operated, to move said operating member in one direction as far as allowed by said aperture adjusting means, while allowing said actuating member to advance said predetermined distance.

2. A camera shutter mechanism
    a casing having a central bore,
    a plurality of shutter blades mounted in said casing to pivot transversely of said bore between open and closed positions, respectively,
    an operating member mounted in said casing to move between active and inactive positions, respectively,
    means connecting said member to said blades to move said blades from their closed to their open positions upon movement of said member from its inactive to its active position, and vice versa,
    resilient means operative normally to maintain said member in its inactive position,
    shutter-actuating means operable momentarily to drive said member from its inactive to its active position, and
    aperture adjusting means mounted on said casing and adjustable from the exterior thereof adjustably to limit the travel of said member during movement thereof to its active position, thereby to limit the size of the aperture formed in said bore by said blades, when the latter are in their open positions,
    said member being a ring oscillatable coaxially of said casing between its active and inactive positions,
    said actuating means including a reciprocable actuating member mounted in said casing to advance a predetermined distance each time said actuating means is operated, and
    second resilient means being interposed between said actuating member and said ring and operative, each time said actuating means is operated, to rotate said ring in one direction as far as allowed by said aperture adjusting means, while allowing said actuating member to advance said predetermined distance.

3. A camera shutter mechanism as defined in claim 2, wherein
    said actuating member is the armature of a solenoid mounted in said casing, and
    said actuating means further comprises means for connecting said solenoid to a control circuit exteriorly of said casing for selectively and momentarily energizing said solenoid to advance said armature.

4. A camera shutter mechanism as defined in claim 3, including
    a normally-open switch mounted in said casing adjacent said solenoid and adapted to be connected in a flash attachment circuit to energize the latter when closed, and
    a movable switch actuating arm mounted in said casing between said switch and said armature for movement by said armature against said switch to close the latter, when said armature has advanced said predetermined distance,
    said second resilient means being operative to disengage said arm from said switch, when said armature is retracted from its advanced position.

5. A camera shutter mechanism as defined in claim 4, wherein
    said actuating arm is mounted at one end to pivot about an axis parallel to the axis of rotation of said ring, and projects at its opposite end transversely in front of said armature to be swung thereby against said switch, when said armature advances, and
    said second resilient means comprises a second, flexible arm fixed at one end to said switch actuating arm and operatively engaged at its opposite end with said ring to impart a flexible torque to said ring in said one direction each time said armature advances.

6. A camera shutter mechanism as defined in claim 2, wherein said aperture adjusting means comprises
    a pin carried by said ring,
    a first lever adjustably mounted on said casing and having thereon an operating surface normally spaced from said pin, when said ring is in its inactive position, and engageable by said pin during rotation of said ring in said one direction to stop further rotation of said ring, and
    a manually adjustable cam on said casing for shifting said first lever to adjust the space normally separating said pin and said operating surface on said lever.

7. A camera shutter mechanism as defined in claim 6, wherein
    said pin is mounted on a second lever, which is pivoted on said ring normally to hold said pin in registry with said operating surface on said first lever,
    a third lever is mounted on said casing for pivotal movement between operative and inoperative positions, respectively, and
    said third lever has thereon a camming surface normally spaced from said pin, when said third lever is in its inactive position,
    said camming surface being operative upon movement of said third lever to its operative position simultaneously to swing said pin out of registry with said first lever, and to rotate said ring a predetermined distance in said one direction to open said blades.

8. A camera shutter mechanism as defined in claim 7, including means resiliently holding said third lever in its operative position, and operative upon operation of said actuating means automatically to return said third lever ot its inoperative position.

9. A camera shutter mechanism as defined in claim 6, wherein said manually adjustable cam comprises a second ring rotatably mounted on said casing coaxially of said bore and having thereon a curved camming surface, and said first lever is mounted on said casing to pivot about an axis parallel to the axis of said bore, and has thereon a follower portion slidably engaged with said curved camming surface, and operative to effect movement of said operating surface selectively toward and away from said pin upon rotation of said second ring relative to said casing.

10. A camera shutter mechanism as defined in claim 9, including a stationary post in said casing, and an integral projection formed on said second ring adjacent one end of said curved camming surface and engageable selectively with said post and with said follower portion of said first lever to limit angular adjustment of said second ring in opposite directions on said casing.

11. A camera shutter mechanism as defined in claim 2, wherein said blades comprise a plurality of identical, thin, generally sickle-shaped plates, each of which has a generally straight end and a curved end, respectively, said plates are pivotally connected adjacent their straight ends to said casing at equiangularly spaced points about said bore for pivotal movement between closed positions in which the curved ends of said plates slidably overlap one another transversely of said bore to block the latter, and open positions in which the edges of said curved ends of said plates form an aperture in said bore coaxially thereof, said connecting means comprises a plurality of pins carried by said ring at equiangularly spaced points thereabout, and pivotally connected to said plates to impart pivotal movement thereto upon rotation of said ring, and the aperture defined by said plates is circular, when said aperture adjusting means has been adjusted to permit maximum rotation of said ring in said one direction, and said plates have been moved to their open positions.

12. A camera shutter mechanism as defined in claim 2, wherein said ring carries an operating pin which extends parallel to the axis of said bore, said actuating member comprises the armature of a solenoid, which is mounted adjacent said operating pin to advance said armature in a direction transverse to the axis of said pin, when energized, and said second resilient means comprises a flexible arm engaged at one end with said pin and extending transverse to said armature to be moved thereby in said one direction, when said armature is advanced, thereby to force said pin to rotate said ring toward its active position.

13. A camera shutter mechanism as defined in claim 12, wherein, a second pin projects is carried by ring parallel to, and at a point angularly spaced from, said operating pin, said aperture adjusting means comprises a cam-operated member adjustably mounted adjacent said second pin and having thereon an operating surface positioned to be engaged by said second pin adjustably to limit the rotation of said ring in said one direction upon advance of said armature, and said blades are operative upon movement of said ring toward its active position to form in said casing an aperture, which registers with the bore in said casing, and which in size is a function of the degree of movement of said ring in said one direction.

14. An electrically actuated shutter mechanism, comprising a casing having a central bore, a plurality of shutter blades mounted in said casing to pivot between open and closed positions relative to said bore, shutter actuating means including a ring normally holding said blades in their closed positions and oscillatable momentarily to pivot said blades from their closed to their open positions, a solenoid mounted in said casing and having its armature operatively connected to said ring to rotate the latter in one direction upon energization of said solenoid, and aperture adjusting means on said casing adjustable manually to limit the pivotal movement of said blades toward their open positions by limiting the rotational movement of said ring in said one direction, said actuating means further including resilient means interposed between said ring and said solenoid and operative to allow said solenoid to advance its armature the same predetermined distance each time the solenoid is energized.

* * * * *